United States Patent [19]

Kambe et al.

[11] Patent Number: 5,002,427
[45] Date of Patent: Mar. 26, 1991

[54] HYDROPHOBIC MATERIAL USED FOR DRAINAGE OF CULVERT

[75] Inventors: Hiroyuki Kambe, Tsuyama; Masashi Shibata, Kume; Masaichi Sugimoto, Tomada, all of Japan

[73] Assignee: Nisshoku Corporation, Okayama Prefecture, Japan

[21] Appl. No.: 391,114

[22] Filed: Aug. 9, 1989

[30] Foreign Application Priority Data

Aug. 20, 1988 [JP] Japan .................................. 63-206562

[51] Int. Cl.⁵ .......................... E02B 11/00; E02D 3/10
[52] U.S. Cl. ......................................... 405/36; 405/45; 405/50
[58] Field of Search ........................ 405/36, 50, 39, 38, 405/43, 45; 210/505, 506, 507, 508

[56] References Cited

U.S. PATENT DOCUMENTS

| 2,316,721 | 4/1943 | Schwartz | 210/505 |
| 3,276,597 | 10/1966 | Mesek et al. | 210/505 |
| 3,441,140 | 4/1969 | Thurber | 405/36 |
| 3,830,067 | 8/1974 | Osborn et al. | 405/45 |
| 3,928,979 | 12/1975 | Terashima et al. | 405/50 |
| 4,301,620 | 11/1981 | Koslow et al. | 405/36 X |
| 4,752,402 | 6/1988 | Gray | 405/36 X |

FOREIGN PATENT DOCUMENTS

| 201167 | 7/1983 | Fed. Rep. of Germany ........ 405/36 |
| 5023528 | 8/1975 | Japan . |
| 5245403 | 11/1977 | Japan . |
| 5517167 | 5/1980 | Japan . |

Primary Examiner—Dennis L. Taylor
Assistant Examiner—Franco S. DeliGuori
Attorney, Agent, or Firm—Wenderoth, Lind & Ponack

[57] ABSTRACT

A hydrophobic material used in the construction of a culver for improving the drainage of the culvert. The hydrophobic material comprises a textile or knit fabric, preferably biodegradable, having large and small mesh portions. A soil-aggregating agent is adhered to the small mesh portions of the textile or knit fabric. The hydrophobic material can be coated with a water soluble film to prevent the soil-aggregating agent from being removed during construction or handling.

The hydrophobic material used for the drainage of a culvert is capable of keeping the water-penetrating property of the culvert for a long time.

5 Claims, 1 Drawing Sheet

HYDROPHOBIC MATERIAL USED FOR DRAINAGE OF CULVERT

BACKGROUND OF THE INVENTION

1. Field of the Invention

The present invention relates to a hydrophobic material used in the construction of a culvert for improving the drainage of the culvert. The material is capable of keeping the water-penetrating property of the soil which is returned to the culvert-draining groove for a long time.

2. Prior Art

In the conventional construction of a culvert, a drain pipe, such as an earthen pipe or a perforated plastic pipe, is placed in a culvert-draining groove from which the soil has been removed, and then the soil is returned to the culvert-draining groove to cover the drain pipe.

In addition, in order to further improve the draining capacity, a method has also been adopted, in which a cover material, such as brushwood, chaff and gravel, is spread around the drain pipe to increase water-penetrating gaps in a circumference of the drain pipe.

However, clods of soil, which are replaced in the culvert-draining groove, are broken down within a short time to become very small soil particles and the resulting soil particles adhere to the water-penetrating gaps in the soil or to the water-penetrating gaps of the cover material and additionally to the water-collecting holes of the drain pipe to stop water from entering the drain pipe. Also, earth and sand are accumulated in the drain pipe to eliminate the draining effect of the culvert in many cases.

The present inventors have proposed in Japanese Patent Publication No. Sho 50-23528 and Japanese Patent Publication No Sho 52-45403 that the surface of the soil clods, which are replaced in the culvert-draining groove or soil existing in a circumference of the culvert, be treated with a soil-aggregating agent to prevent the breakage of the clods over time, thereby using the soil itself as a filter medium.

The above-described method has been effective in improving the drainage of a culvert and has achieved a tentative success. However, since the above-described method is a method in which the removed soil clods or the removed groove portion is directly sprayed with an aqueous solution of a soil-aggregating agent to treat the surface of the clods or the soil existing in the circumference of the culvert and impregnate it with the aqueous solution of soil-aggregating agent, various kinds of mechanical apparatus are required in the construction of the culvert and about 50 to 60 liters of the aqueous solution of the soil-aggregating agent must be sprayed to treat 1 $m^3$ of soil. Furthermore, increased time and labor are required in the construction of the culvert.

Additionally, the soil in the weak ground zone requiring the construction of the culvert is wet, and thus the marks of aqueous solution sprayed can not be visually confirmed, making it difficult to inspect.

The present inventors have also proposed a method, in which at least one of the four sides surrounding a culvert-draining groove in a longitudinal direction is covered with a filter medium obtained by housing a soil-aggregating agent in a water-permeable filter medium or by putting the soil-aggregating agent between the water-permeable filter media, as described in Japanese Patent Publication No. Sho 55-17167, as a result of their various investigations aimed at the improvement of the above-described method.

Cloth, nonwoven fabric, urethane foam, coconut mat and the like have been used as the filter medium in this method, and the soil-aggregating agent is housed in a bag formed by this filter medium or is put between two pieces of this filter medium.

The culvert is constructed by placing the filter medium, in which the soil-aggregating agent is housed or put between, on at least one of the four sides surrounding the longitudinal direction of the culvert-draining groove and by returning the soil into the groove.

According to this method, the filter medium, in which the soil-aggregating agent is housed or put between, is merely placed on the culvert-draining groove and no special mechanical apparatus is required. Moreover, since an advantage exists in this method in that the placement of the filter medium can be visually confirmed, inspection is easily achieved, and this method has been used in the construction of many culverts.

The cloth, nonwoven fabric and urethane foam, which have been used as a filter medium and have small water-penetrating gaps, have been found to be suitable for the material for housing the soil-aggregating agent therein or for putting the soil-aggregating agent therebetween, but a problem has occurred in that since the water-penetrating gaps are small, when muddy water passes through the water-penetrating gaps, soil particles are gradually accumulated on the filter medium to form a non-water-penetrating layer.

On the contrary, when coconut mat and a net of a large mesh having large water-penetrating gaps are used as the filter medium, there is not the possibility that the soil particles will accumulate on the filter medium. However, a problem has occurred in that these filter media are insufficient for housing the soil-aggregating agent therein or for putting the soil-aggregating agent therebetween, and the soil-aggregating agent is apt to come off during construction.

In addition, in the case of a filter medium for housing the soil-aggregating agent therein or for putting the soil-aggregating agent therebetween, the water-penetrating property is further reduced in the initial period after construction when a highly viscous aqueous solution of a soil-aggregating agent is used, so that the filter medium hardly exhibits the water-penetrating property.

As described above, both methods, in which the aqueous solution of soil-aggregating agent is directly sprayed (hereinafter simply referred to as the spraying method), and in which the filter medium housing the soil-aggregating agent therein or containing the soil-aggregating agent therebetween is buried (hereinafter simply referred to as the filter method), have advantages and disadvantages. Despite its disadvantages, the filter method is superior to the two methods in constructability and in confirming the marks of construction, and thus is still attractive.

Thus, the present inventors have conducted research aimed at solving the problem incidental to the filter method, that is, the problem that the water-penetrating property of the filter medium can not be improved. As a result of these investigations, the present inventors have discovered that the soil particles accumulating in the small water-penetrating gaps of the filter medium to remarkably reduce the water-penetrating property are silt and clay having diameters of 0.074 mm or less. In other words, the present inventors have been the first to discover the construction of a filter medium capable of preventing silt and clay from accumulating on the filter portion and capable of easily adhering the soil-aggregating agent therebetween, and thus they have completed the hydrophobic material of the present invention for improving the drainage of a culvert, capable not only of obtaining the effects equivalent to those of the spraying method but also of keeping the water-penetrating property of the soil around the culvert for a long time.

SUMMARY OF THE INVENTION

Accordingly, the present invention provides a hydrophobic material used for the drainage of a culvert in which a soil-aggregating agent is adhered to the small mesh portions of a textile good or knit good comprising both small and large mesh portions, and to a hydrophobic material used for the drainage of a culvert, characterized in that a water soluble film is adhered to the soil-aggregating agent so as to cover the entire surface of the textile good or knit good. In addition, it is desirable that the textile good or knit good be formed of biodegradable materials.

DETAILED DESCRIPTION OF THE PREFERRED EMBODIMENTS

Figure 3:
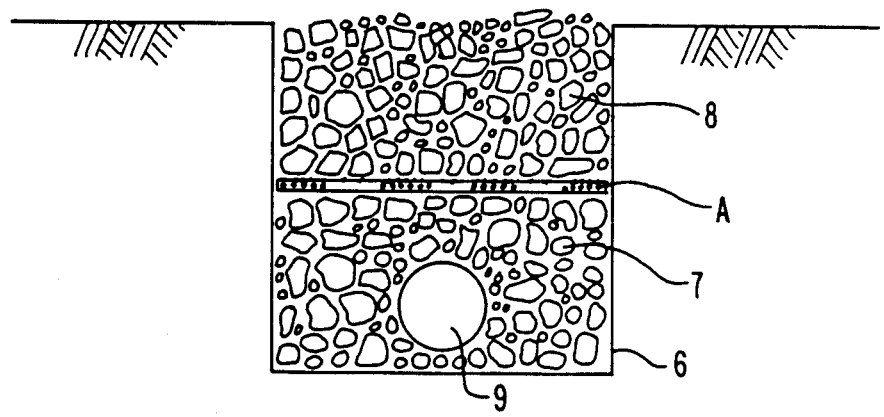
FIG. 3 is a cross-sectional view of the construction of a culvert according to one preferred embodiment of the present invention, wherein a hydrophobic material according to the present invention is used.

The present invention is described in more detail below with reference to the preferred embodiment shown in FIG. 3.

The textile good or knit good used in the present invention are now described. Materials are not limited to raw material yarns, but any yarn formed of preferably vegetable, animal and chemical fibers, which are apt to be degraded in the soil, can be used. In general, yarns of 30 to 40 deniers formed of staple fibers are used. For example, in the textile good shown in FIG. 1, warps are used at a ratio of 250 to 300 pieces/10 cm (the warps are arranged at intervals of 0.1 to 0.3 mm) in the small mesh portions while the warps are arranged at intervals of 5 to 15 mm in the large mesh portions, and the large mesh portions occupy 8 to 20% of the whole width.

Figure 1:
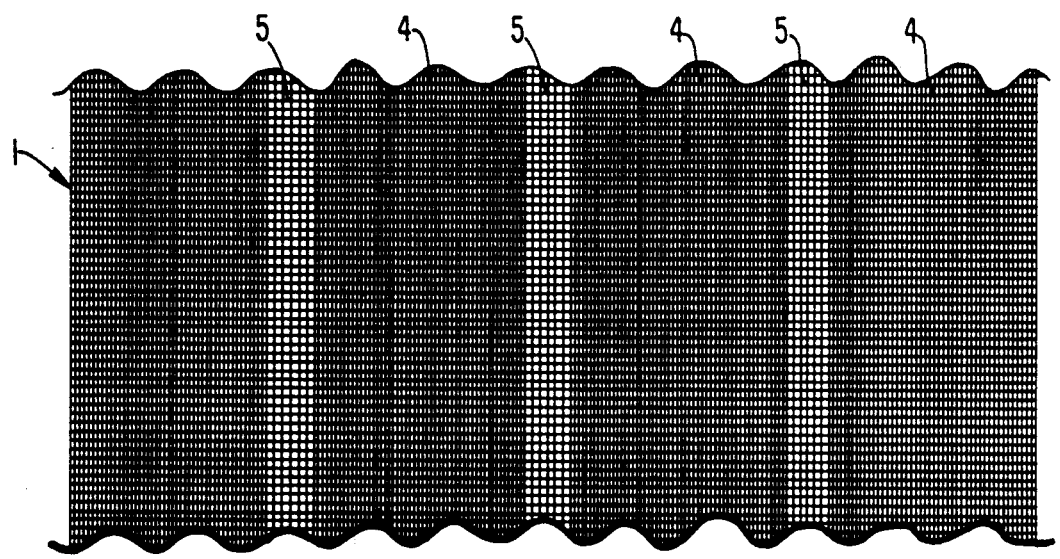
FIG. 1 is a partial top plan view showing a small and large mesh fabric which is used to construct the hydrophobic material according to the present invention.

Wefts are uniformly arranged at intervals of 5 to 15 mm. The warps and the wefts are woven to make a mosquito net fabric with small mesh portions of 5 to 15 cm wide and large mesh portions of 1 to 3 cm wide arranged alternately as shown in FIG. 1.

In addition, powdery or granular polyethylene oxide, polyacryl amide, sodium polyacrylate and the like can be used as the soil-aggregating agent singly or in combination.

Also, a film, which is floated on a stationary water surface and then dissolved or dispersed in water within 2 minutes without stirring, is used as the water soluble film. One example is a polyvinyl alcohol (PVA) film of 20 to 40 $\mu$ thick.

FIRST PREFERRED EMBODIMENT

Figure 2:
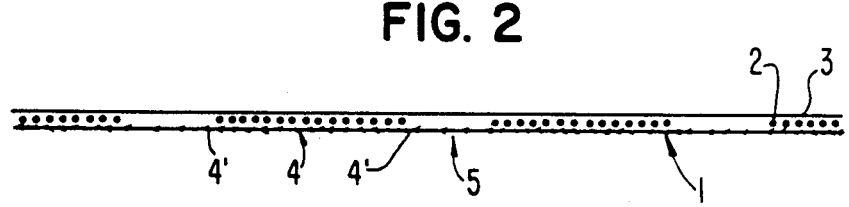
FIG. 2 is a partial cross-sectional view of the hydrophobic material according to the present invention.

In the construction of the hydrophobic material used for the drainage of a culvert according to the present invention with reference to FIG. 2, warps of 30 to 40 deniers formed of staple fibers are used at a ratio of 250 to 300 pieces/10 cm in the small mesh portions while the warps are arranged at intervals of 5 to 15 mm in the large mesh portions. The wefts are uniformly arranged at intervals of 5 to 15 mm all over the small and large mesh portions. A small quantity of water is applied all over the mosquito net of small and large mesh fabric (1) with the small mesh portions (4) of 5 to 15 cm in width and the large mesh portions (5) of 1 to 3 cm in width repeated alternately and said soil-aggregating agent (2), for example powdery or granular polyethylene oxide and the like, is uniformly added and adhered to a central portion of the small mesh portions (4) excepting 1 to 2 cm of both ends [indicated by reference number (4') in FIG. 2] of the small mesh portions (4) to obtain the hydrophobic material according to the present invention.

SECOND PREFERRED EMBODIMENT

A small quantity of water is additionally applied to the adhered soil-aggregating agent and a water soluble film (3) represented by a PVA film is adhered to the soil-aggregating agent (2) by for example rolling so as to cover the entire surface of the mosquito net of small and large mesh fabric (1). In the case where the water soluble film (3) is adhered in this manner, the soil-aggregating agent (2) can be prevented from coming off from the small and large mesh fabric (1) during the construction of the culvert and the like.

In addition, in both the first preferred embodiment and the second preferred embodiment, products with a width of 40 cm to 2 m are produced by the use of machines. The large mesh portions are slit so as to have a width of for example 20 to 50 cm in accordance with the width of the culvert to be used and are provided in the form of a roll having a length of about 100 m. In addition, although textile goods are used in the preferred embodiments, knit goods may be used in place of the textile goods.

Next, one preferred embodiment of the construction of a culvert using the hydrophobic material of the present invention is described with reference to FIG. 3. A drain pipe (9), such as a perforated plastic pipe or earthen pipe, is laid in a culvert-draining groove (6) and then the removed soil is returned into the groove up to a height of 15 to 40 cm from the bottom of the groove (primary returned soil (7)) with or without laying a protective material, such as chaff, gravel and rice straw, and additionally the hydrophobic material (A) according to the present invention is laid along the groove so that the water soluble film (3) is on the lower side. Subsequently, the rest of the removed soil (secondary soil to be returned) (8) is placed onto the hydrophobic material (A).

The hydrophobic material according to the present invention can also be used for the bottom portion and side portions of the culvert-draining groove, the circumference of the culvert or the circumference of the drain pipe in addition to its us in the preferred embodiments.

Thus, the present invention relates to a hydrophobic material used for the drainage of a culvert in which a soil-aggregating agent is adhered to small mesh portions of textile goods or knit goods comprising both large and small mesh portions, and to a hydrophobic material used for the drainage of a culvert characterized in that a water soluble film is adhered to the soil-aggregating agent so as to cover the entire surface of the textile goods or knit goods, so that the following effects are exhibited.

That is, since the hydrophobic material used for the drainage of a culvert according to the present invention is merely laid in the culvert-draining groove and the removed soil is replaced in the culvert-draining groove in the same manner as the conventional filter method, in comparison with the spraying method, no specialized machine is required in the construction of the culvert, labor is reduced, and the marks of construction are visually confirmed, thereby the inspection is easily executed.

In addition, if the hydrophobic material used for the drainage of a culvert according to the present invention is laid in the culvert-draining groove, the water soluble film is speedily dissolved or dispersed by the moisture in the surrounding soil or rain water and the soil-aggregating agent also starts to be dissolved and penetrates at the same time. However, for 0.5 to 1 month from the date of construction, the soil-aggregating agent adhered to the small mesh portions of the large and small mesh fabric is turned into a laminar high-concentration and high-viscosity aqueous solution, and the water-penetrating property of the small mesh portions of the large and small mesh fabric is reduced to an order of $10^{-3}$ cm/sec. Nevertheless, rainwater penetrating into the soil for the 0.5 to 1 month after the date of construction and water remaining on the surface of the earth can be removed without delay through the large mesh portions of the large and small mesh fabric.

After the elapse of about 1 month from the date of construction, the soil-aggregating agent adhered to the small mesh portions of the large and small mesh fabric is perfectly dissolved and penetrates into the lower soil, whereby not only a water-proof film is formed on the surface of the clods but also the soil is aggregated and as a result, water-penetrating gaps equivalent to those produced by the spray method are maintained.

Since the intervals of yarns in the small mesh portions of the large and small mesh fabric are 0.1 to 0.3 mm after the soil-aggregating agent has dissolved and come off, soil particles having diameters of 0.074 mm or less, which are accumulated in the conventional filter medium to reduce the water-penetrating property, can pass through the openings of the large and small mesh fabric of the present invention. Thus, in comparison with the conventional filter medium, the water-penetrating gaps of the present invention are not too small, thereby preventing soil particles from accumulating to form a non-water-penetrating layer, nor are the water-penetrating gaps are too large, thereby preventing the soil-aggregating agent from being sufficiently adhered to the filter medium or between the filter medium or from coming off during construction.

Thus, the present invention provides a hydrophobic material used for the drainage of a culvert capable of keeping the water-penetrating property for a long time in the same manner as the spraying method without accumulating the soil particles. In addition, in the case where a water soluble film is adhered to the soil-aggregating agent so as to cover the entire surface of the textile good or knit good, the soil-aggregating agent can be prevented from being removed from the large and small mesh textile good or knit good during the construction work and the like.

Also, when the textile good or knit good are formed of degradable materials, the textile goods or knit goods will be degraded if the culvert is reexcavated so that there will be no possibility that the hydrophobic material is in the way later.

What is claimed is:

1. A hydrophobic material for use in the construction of a culvert to improve the drainage of the culvert, which comprises a textile or knit good comprising large and small mesh portions, a soil-aggregating agent adhered to the small mesh portions of the textile or knit good, and a water soluble film covering the entire surface of the textile or knit good and the soil-aggregating agent, wherein the textile or knit good has warps of 30 to 40 deniers in a ratio of 250 to 300 pieces/10 cm in the small mesh portions and 5 to 15 mm in the large mesh portions, and wherein the large mesh portions comprise 8 to 20% of the width of the textile or knit good.

2. A hydrophobic material according to claim 1, wherein the textile or knit good is formed from a biodegradable material.

3. A hydrophobic material according to claim 1, wherein the textile or knit good has warps and wefts woven to define a net fabric with small mesh portions 5 to 15 cm in width alternating with large mesh portions 1 to 3 cm in width.

4. A hydrophobic material according to claim 1, wherein the soil-aggregating agent is at least one member selected from the group consisting of polyethylene oxide, polyacryl amide, and sodium polyacrylate.

5. A hydrophobic material according to claim 1, wherein the water soluble film is a polyvinyl alcohol film.

* * * * *